(No Model.)
H. F. & G. F. SHAW.
MOTIVE MECHANISM FOR RAILWAY CARS.
No. 404,441. Patented June 4, 1889.
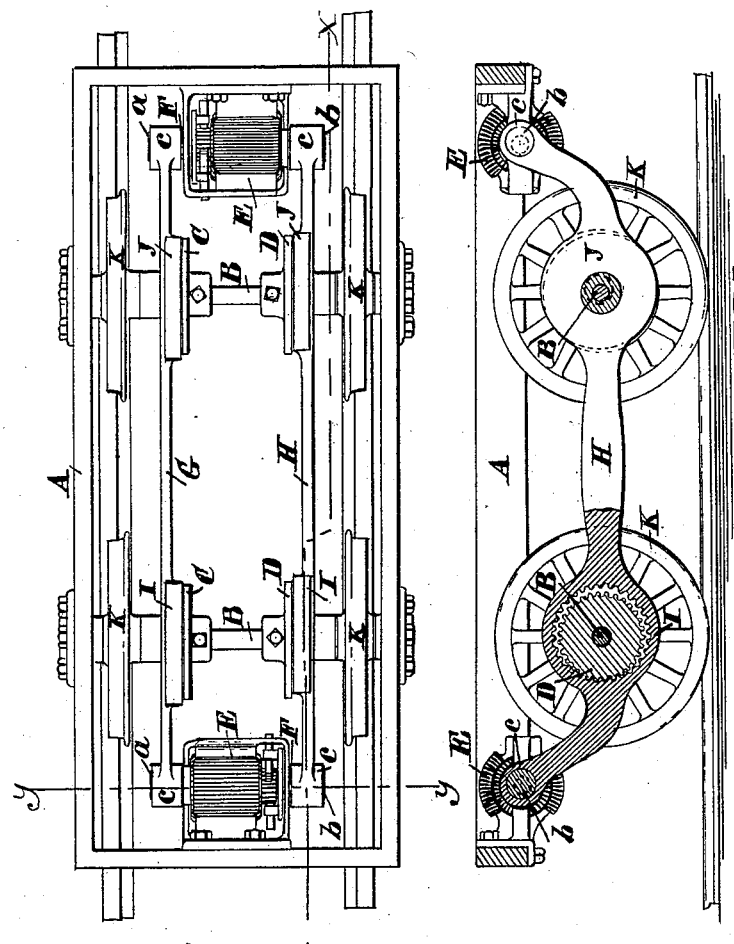
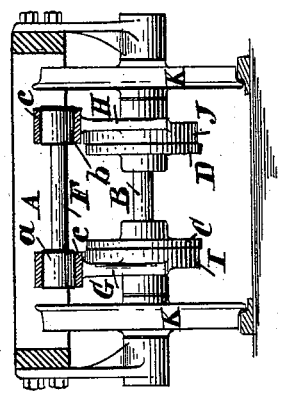
Witnesses:
Edward Wyman
Wm. E. Woodward.
Inventors:
Henry F. Shaw,
George F. Shaw,
per Edw. Dummer, Atty.

UNITED STATES PATENT OFFICE.

HENRY F. SHAW, OF BOSTON, AND GEORGE F. SHAW, OF DEDHAM, MASSACHUSETTS.

MOTIVE MECHANISM FOR RAILWAY-CARS.

SPECIFICATION forming part of Letters Patent No. 404,441, dated June 4, 1889.

Application filed January 26, 1889. Serial No. 297,688. (No model.)

*To all whom it may concern:*

Be it known that we, HENRY F. SHAW, a citizen of the United States, residing at Boston, in the county of Suffolk and State of Massachusetts, and GEORGE F. SHAW, a citizen of the United States, residing at Dedham, in the county of Norfolk and State of Massachusetts, have invented a new and useful Improvement in Motive Mechanism for Railway-Cars, of which the following is a specification, reference being had to the accompanying drawings.

Our invention relates to mechanism especially adapted for propelling railway-cars when electricity is employed as the motive power, the object being, primarily, to convert readily, simply, and with little friction the desirable high speed of the motor-shaft into comparatively slow speed for the car-axle.

The invention consists in a device in which an external gear and an internal gear are in engagement with each other, the gears being so mounted that one will rotate about its axis, while the other will not revolve on its own axis, but be carried in such a manner that its axis will move around the axis of the other gear, the invention further consisting in the combination of said device with an electric motor or electric motors and a car-truck, as hereinafter set forth, and specifically pointed out in the claims.

In the drawings, Figure 1 is a plan view of a car-truck and electric motors and gearing combined therewith embodying our invention. Fig. 2 is a vertical section taken on line X X in Fig. 1. Fig. 3 is a transverse section on line Y Y in Fig. 1, the motors, with the exception of one of their shafts, being omitted.

The truck-frame A, supported by and provided with suitable bearings for the ordinary axles B, may be that of a car for a street or other railway. Fixed on each of the axles are two external gears C and D. Fixed in suitable position at each end of the truck is an electric motor E. Each electric motor may be of any suitable well-known construction, and may be supplied with electricity by means of the usual connections. On the shaft F of each motor are two eccentrics $a$ and $b$. The two eccentrics on a shaft are set "quartering" with reference to each other. On two eccentrics—one on each motor-shaft—is a connecting-rod G and on the other two eccentrics a connecting-rod H. Each of these rods has a suitable bearing $c$ at the end for the movement therein of the corresponding eccentric. Each of the connecting-rods has two internal gears I and J fixed rigidly thereto and maintained thereby in position to engage with the corresponding gears on the axles, as shown. Each of the internal gears has a larger pitch-diameter than the corresponding external gear.

In operation, on revolution of the motor-shafts each of the connecting-rods will be so propelled by means of the two eccentrics which move in the rod that the axis of each of the internal gears fixed to the rod will be carried around the axis of the corresponding external gear, the internal gears not revolving on their own axes. The external and internal gears being in engagement, as specified and shown, the result is a rotary motion of all the external gears, the axles, and wheels K, and hence propulsion of the car. The direction of motion of axles, wheels, and car will depend upon the direction of motion of the motor shafts, as with ordinary gearing. The speed of the axles and wheels thereon may be very much slower than that of the motor-shafts. The difference of speed will be in proportion to the difference of pitch-diameter—that is, the difference in number of teeth—of an external and corresponding internal gear. The internal gear may have a very few teeth more than the external gear.

While we prefer to employ two motors and the number of gears shown, and to arrange these devices as specified with reference to the connecting-rods and parts of the car-truck, yet the number and arrangement may be modified without departing from the spirit of the invention. It may be well to note, as follows, certain modifications which may thus occur and which may be made to appear from the drawings.

It is evident that the car will be propelled if but one of the motors receives the electricity. In such a case the other motor-shaft will serve to keep the internal gears in true working position, being simply rotated by means of the shaft of the acting motor and the connecting-rods. Thus it appears that one of the motors may be dispensed with, while any shaft or the like having eccentrics may take the place of the other motor-shaft.

Only one connecting-rod may be used. The eccentrics on each shaft may be set otherwise than quartering.

It will also appear that our invention is suitable for reducing speed for stationary work, one or more pulleys taking the place of the car-wheels, any appropriate fixed frame being substituted for the truck-frame.

We claim as our invention—

1. The combination of two electric motors, an eccentric on each of the motor-shafts, a rod having bearings for said eccentrics, two car-axles, and two external and two internal gears, two of said gears being fixed to said rod, one of said gears being fixed on each car-axle, and each internal gear being in engagement with the corresponding external gear, substantially as and for the purpose set forth.

2. The combination of two electric motors, an eccentric on each of the motor-shafts, a rod having bearings for said eccentrics, an external gear and an internal gear in engagement with each other, one of said gears being fixed to said rod and the other gear fixed on a car-axle to revolve therewith, substantially as and for the purpose set forth.

3. The combination of two electric motors, two eccentrics on each of the motor-shafts, two rods, each of which is mounted on an eccentric on each of said shafts, two gears fixed to each of said rods, two axles or shafts, each of which has fixed thereon two gears, each gear fixed to a rod being in engagement with a gear on an axle or shaft, one of any two gears in engagement with each other being an external and the other an internal gear, substantially as specified.

HENRY F. SHAW.
GEORGE F. SHAW.

Witnesses:
JAMES M. CODMAN, Jr.,
EDW. DUMMER.